(12) United States Patent
Wakamatsu et al.

(10) Patent No.: US 7,826,730 B2
(45) Date of Patent: Nov. 2, 2010

(54) IMAGE CAPTURING DEVICE HAVING A HAND SHAKE CORRECTION FUNCTION, HAND SHAKE CORRECTION METHOD, AND STORAGE MEDIUM STORING A HAND SHAKE CORRECTION PROCESS PROGRAM

(75) Inventors: Takashi Wakamatsu, Kawasaki (JP); Kaoru Chujo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 11/657,546

(22) Filed: Jan. 25, 2007

(65) Prior Publication Data
US 2008/0069551 A1 Mar. 20, 2008

(30) Foreign Application Priority Data
Sep. 20, 2006 (JP) .............................. 2006-255101

(51) Int. Cl.
G03B 17/00 (2006.01)
H04N 5/228 (2006.01)
H04N 5/262 (2006.01)

(52) U.S. Cl. ...................... 396/55; 348/208.4; 348/239

(58) Field of Classification Search ............. 396/52–55; 348/208.99, 208.1, 208.4, 208.6, 239, 364
See application file for complete search history.

(56) References Cited

U.S. PATENT DOCUMENTS

| 6,548,800 B2* | 4/2003 | Chen et al. ............... 250/208.1 |
| 6,571,002 B1* | 5/2003 | Ogawa ....................... 382/117 |
| 7,463,284 B2* | 12/2008 | Tamamura ............... 348/208.1 |
| 2003/0210343 A1 | 11/2003 | Okada |
| 2004/0145673 A1* | 7/2004 | Washisu ..................... 348/364 |
| 2006/0187308 A1* | 8/2006 | Lim et al. ................. 348/208.4 |

FOREIGN PATENT DOCUMENTS

| JP | 7-28149 A | 1/1995 |
| JP | 2000-115511 A | 4/2000 |
| JP | 2000-259833 A | 9/2000 |
| JP | 2003-333414 A | 11/2003 |

* cited by examiner

Primary Examiner—Christopher E Mahoney
Assistant Examiner—Minh Q Phan
(74) Attorney, Agent, or Firm—Westerman, Hattori, Daniels & Adrian, LLP (57) ABSTRACT

The proposed image capturing device having a hand shake correction function comprises a base image selecting unit for selecting a base image, which is used when a hand shake correction is made, from among a plurality of pieces of captured image data, and a correction processing unit for performing a correction process by using the selected base image.

10 Claims, 12 Drawing Sheets

| USER ACTION | SCREEN DISPLAY |
|---|---|
| (1) PRESS OF CAMERA BUTTON | (1) CAMERA FINDER DISPLAY |
| (2) PRESS OF SHUTTER BUTTON | (2) CAMERA FINDER STOP |
| (3) VERIFICATION OF DISPLAY IMAGE<br>· PRESS ENTER BUTTON TO STORE DISPLAY IMAGE<br>· PRESS ⇒ BUTTON TO DISPLAY NEXT IMAGE | (3) DISPLAY OF CORRECTED IMAGE i  } REPEATED BY $i=1$-n TIMES |

| USER ACTION | SCREEN DISPLAY |
|---|---|
| (1) PRESS OF CAMERA BUTTON | (1) CAMERA FINDER DISPLAY |
| (2) PRESS OF SHUTTER BUTTON | (2) CAMERA FINDER STOP |
| (3) VERIFICATION OF DISPLAY IMAGE<br>• PRESS ENTER BUTTON WHEN DISPLAYED IMAGE IS THE ONE THAT USER DESIRES TO USE AS BASE<br>• PRESS ⇒ BUTTON TO DISPLAY NEXT IMAGE | (3) DISPLAY ORIGINAL IMAGE i OBTAINED BY CONTINUOUS SHOOTING } REPEATED BY i=1~n TIMES |

IMAGE CAPTURING DEVICE HAVING A HAND SHAKE CORRECTION FUNCTION, HAND SHAKE CORRECTION METHOD, AND STORAGE MEDIUM STORING A HAND SHAKE CORRECTION PROCESS PROGRAM

BACKGROUND OF THE INVENTION

1. Field of the Invention

The present invention relates to an image capturing device having a hand shake correction function, a hand shake correction method, and a storage medium storing a hand shake correction process program, and more particularly, to an image capturing device having a hand shake correction function, a hand shake correction method, and a storage medium storing a hand shake correction process program, which can make a correction with higher precision.

2. Description of the Related Art

If shooting is made with a digital camera (image capturing device) built in a cellular phone, etc., an influence of a hand shake is exerted on an image to be captured, for example, due to a reason that a hand holding the cellular phone shakes during an exposure time. To suppress the influence exerted by the hand shake, a hand shake correction is made to the captured image.

In recent years, a digital camera, especially, a digital camera included in a cellular phone has rapidly become widespread. Additionally, a user demand for the performance and the convenience of a digital camera has been increasing.

In response to such a demand, not only increases in pixilation and a zoom factor in terms of performance but also reductions in size and weight in terms of convenience have been in rapid progress.

However, such improvements in the performance and the convenience can cause a hand shake to easily occur. Especially, a digital camera built in a cellular phone is carried all the time, and accordingly, shooting is made, for example, in a very dark place in many cases. However, since a flash is not built in most cases, a hand shake tends to occur in comparison with other digital cameras.

As methods for coping with a hand shake, a method for optically correcting a hand shake, and a method for correcting a hand shake with a digital process are conventionally proposed.

For a normal digital camera, a method for optically correcting a hand shake has already been commercialized. Meanwhile, for a digital camera built in a cellular phone, a method for correcting a hand shake with a digital process has started to be commercialized.

With a camera adopting a method for correcting a hand shake with a digital process, one image to which a hand shake correction is made is obtained by superimposing a plurality of images captured with continuous shooting. Such a hand shake correction method fixes an image, which becomes a base used when images are superimposed. Therefore, it becomes impossible to correct a shake that occurs in the base image, and the amount of shake appears as the amount of shake of a corrected image. For example, if n images are shot with continuous shooting, the images are synthesized by fixedly regarding an mth ($1 \leq m \leq n$) image as a base image among the 1st to the nth images. If a shake that occurs in the mth image is big at this time, a similar shake is left also in a corrected image. Therefore, an expected correction effect cannot be obtained.

Furthermore, as other techniques for correcting a hand shake, for example, techniques disclosed by Patent Documents 1 and 2 are known.

Patent Document 1 discloses an electronic camera having, two modes such as a shake correction mode and a non-shake correction mode. With this electronic camera, a shake correction is made in each exposure period of a CCD during a shooting preparation period (in the non-shake correction mode), and the shake correction is not made while pixel data is output.

Patent Document 2 discloses a camera that can control the operation speeds of a mirror and a shutter by changing from the speeds in a normal shooting mode, when an anti-shake shooting mode is selected. A shooting mode selecting unit of this camera selects the shooting modes of the camera, such as the anti-shake shooting mode, the normal shooting mode, etc. Additionally, a driving speed changing unit outputs, to a mirror driving unit and a shutter driving unit, an instruction to change the driving speeds of the mirror and the shutter when exposure is started based on a result of the selection made by the shooting mode selecting unit.

[Patent Document 1] Japanese Published Patent Application No. 2003-333414 "Electronic Camera"

[Patent Document 2] Japanese Published Patent Application No. H7-28149 "Camera Shake Preventing Device"

SUMMARY OF THE INVENTION

An object of the present invention is to provide an image capturing device having a hand shake correction function, a hand shake correction method, and a hand shake correction process program, which can make a hand shake correction with higher precision.

An image capturing device having a hand shake correction function according to a first aspect of the present invention comprises an image sensor for photo-electrically converting light received from an image capturing target and for outputting the photo-electrically converted data, an image data generating unit for generating image data based on the photo-electrically converted data, a shooting controlling unit for outputting exposure control information to the image sensor and for capturing a plurality of pieces of image data in response to a shooting instruction, a base image selecting unit for selecting a base image, which is used when alignment is made, from among the plurality of pieces of captured image data, and a correction processing unit for making the alignment of the plurality of pieces of captured image data based on the selected base image and for generating one piece of image data by synthesizing the plurality of pieces of image data based on a result of the alignment.

An image capturing device having a hand shake correction function according to a second aspect of the present invention is characterized in that the base image selecting unit selects image data, in which the amount of shake is the smallest, among the plurality of pieces of captured image data as a base image used when the alignment is made, in the first aspect.

Here, image data in which the amount of shake is the smallest among the plurality of pieces of captured image data is selected by the base image selecting unit as a base image used when the hand shake correction is made, whereby also a shake remaining in image data, to which the hand shake correction (synthesis) is made, becomes the smallest, and a hand shake correction with higher precision can be made.

An image capturing device having a hand shake correction function according to a third aspect of the present invention is characterized in that a face recognizing unit for recognizing the degree of opening of eyes of a face of a person, which is included in a plurality of pieces of captured image data is further comprised, and the base image selecting unit selects image data, in which the degree of opening of eyes of the face of the person is recognized to be the highest by the face recognizing unit, as a base image used when the alignment is made, in the first aspect.

Here, the image data in which the degree of opening of eyes of the face of the person, which is recognized to be the highest by the face recognizing unit, is selected as a base image used when the alignment is made, whereby the face of the person who opens his or her eyes most widely is left also in image data to which the hand shake correction (synthesis) is made, and a hand shake correction with higher precision can be made.

An image capturing device having a hand shake correction function according to a fourth aspect of the present invention is characterized in that the base image selecting unit selects each of the plurality of pieces of captured image data as a base image, the correction processing unit makes the alignment of the plurality of pieces of captured image data based on each base image, and generates one piece of image data by synthesizing the plurality of pieces of image data based on a result of the alignment for each selected base image, and a user interface unit for displaying respective pieces of corrected image data, and for being able to select and store one or more pieces of image data from the respective pieces of displayed image data is further comprised, in the first aspect.

Here, image data, to which the hand shake correction (synthesis) is made with the use of each of the plurality of pieces of captured image data as a base image, is generated by the correction processing unit, and image data to be stored is selected via the user interface unit from among the plurality of pieces of synthesized and generated data, whereby a hand shake correction with higher precision can be made by selecting synthesized image data in which the amount of shake is the smallest for a user from a vision viewpoint, for example, when the image data to be stored is selected.

An image capturing device having a hand shake correction function according to a fifth aspect of the present invention is characterized in that the base image selecting unit is a user interface unit for displaying the plurality of pieces of captured image data, and for being able to select a base image, which is used when the alignment is made, from among the plurality of pieces of displayed image data, in the first aspect.

Here, image data to be used as a base image when the hand shake correction is made is specified via the user interface unit from among the plurality of pieces of captured image data. Therefore, a hand shake correction with higher precision can be made by specifying image data in which the amount of shake is the smallest for a user from a vision viewpoint, for example, when the base image data is specified.

According to the present invention, in an appliance comprising an image capturing device, which makes a hand shake correction with continuous shooting, a hand shake correction with higher precision can be made.

DESCRIPTION OF THE PREFERRED EMBODIMENTS

Preferred embodiments according to the present invention are hereinafter described in detail with reference to the drawings.

Figure 1:
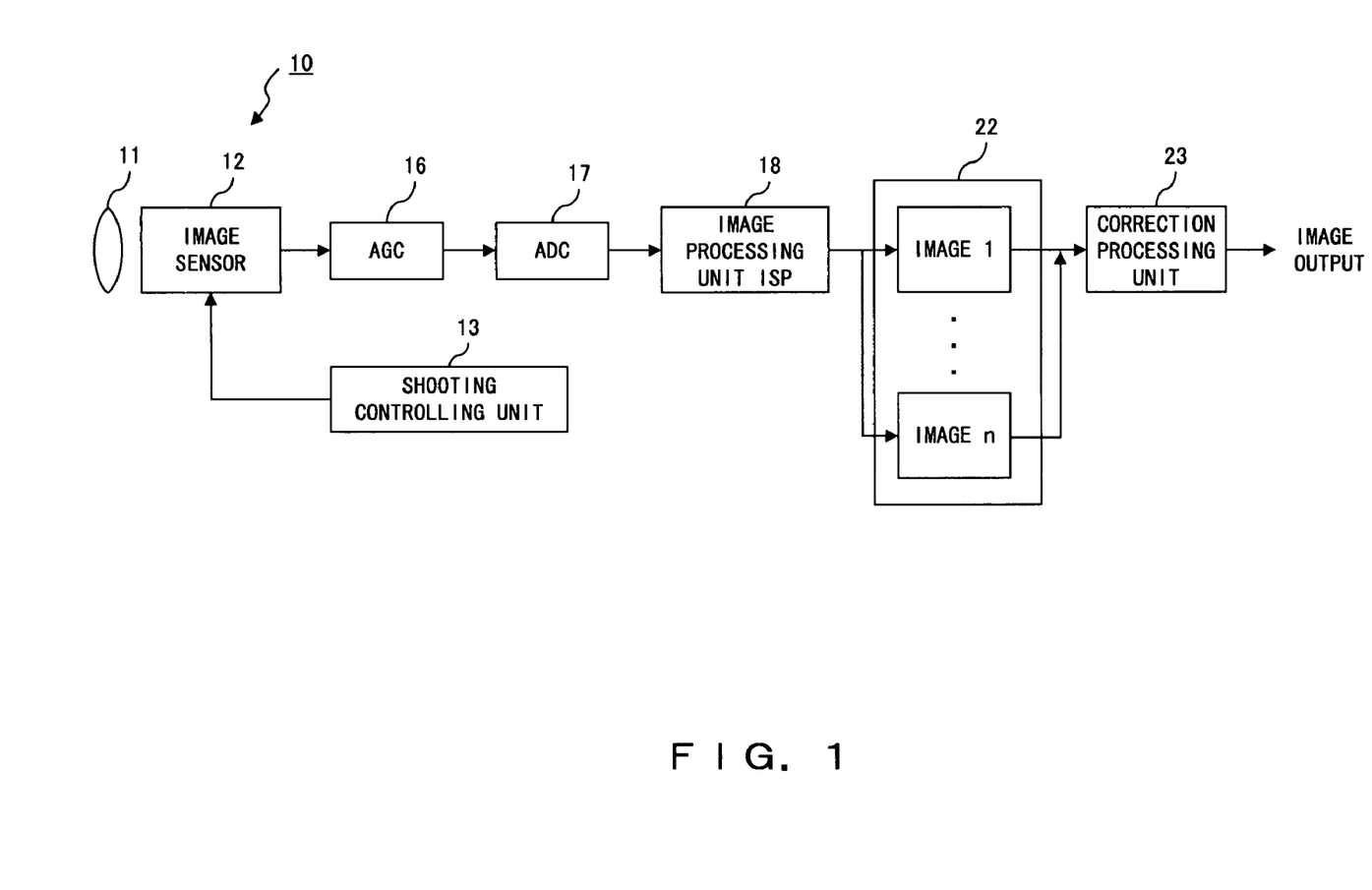
FIG. 1 is a block diagram showing a configuration of an image capturing device common to preferred embodiments of the present invention.

FIG. 1 is a block diagram showing a configuration of an image capturing device common to preferred embodiments of the present invention.

In this figure, the image capturing device 10 comprises a lens 11, an image sensor 12, a shooting controlling unit 13, an AGC (Auto Gain Control) circuit 16, an AD converter (Analog Digital Converter, ADC) 17, an image processing unit (referred to also as an image signal processor (ISP)) 18, a memory 22, and a correction processing unit 23.

The lens 11 gathers light from an image capturing target (subject) on the image sensor 12.

The image sensor 12 comprises a light receiving unit (not shown) for photo-electrically converting the light received from the image capturing target via the lens 11 into an electric charge and for storing the electric charge, and a signal outputting unit (not shown) for outputting the stored electric charge as photo-electrically converted data.

The AGC circuit 16 controls the gain of the photo-electrically converted data output from the image sensor 12.

The ADC 17 converts the photo-electrically converted data, the gain of which is controlled, from analog to digital.

The image processing unit 18 generates image data based on the output of the AD converter 17. Namely, the image processing unit 18 performs processes such as a color separation process, a gamma correction process for linearly expressing lightness on a display, a white balance control process for expressing white as white regardless of the temperature of a light source, and the like based on a signal (referred to also as raw data) input from the ADC 17. The input signal is converted into a required format such as a YUV signal, an RGB signal, etc. via the color separation process.

The shooting controlling unit 13 outputs a control signal, which includes exposure control information calculated for the image capturing target, to the image sensor 12, and captures a plurality of pieces of image data via the image capturing process performed by the image sensor 12 (the processes performed by the above described light receiving unit and signal outputting unit), in response to a shooting instruction.

The plurality of pieces of image data, which are captured via the image capturing process performed by the image sensor 12, are stored in the memory 22 via the image processing unit 18.

The correction processing unit 23 reads the plurality of pieces of image data stored in the memory 22, generates one or a plurality of pieces of image data, to which a hand shake correction is made based on the read image data, and outputs the one or more pieces of generated image data (to which the hand shake correction is made) to a memory (not shown) for storing image data in a succeeding stage. Operations of the correction processing unit 23 vary by preferred embodiment.

If the shooting controlling unit 13, the image processing unit 18, and the correction processing unit 23 are implemented as a program, a central processing unit (CPU), which executes the process of the shooting controlling unit 13 and that of the image processing unit 18, may match or differ from a CPU, which executes the process of the correction processing unit 23 for a hand shake correction.

The present invention aims at improving the quality of an image to which a hand shake correction is made.

In the first and the second preferred embodiments, image data in which the amount of shake is the smallest among a plurality of pieces of captured image data is recognized as a base image used when a hand shake correction is made, thereby improving an image quality.

Additionally, in the third preferred embodiment, image data, for which a hand shake correction process is performed when all of pieces of captured image data are respectively used as a base image, is generated for all of the pieces of captured image data, and a user selects any of the pieces of generated image data, thereby improving an image quality.

Furthermore, in the fourth preferred embodiment, a user selects any of a plurality of pieces of captured image data as a base image used when a hand shake correction is made, and image data to which a hand shake correction is made is generated by using the selected image data as a base image, thereby improving an image quality.

Still further, in the fifth preferred embodiment, if a person is included in an image capturing target, the face of the person is recognized, whether or not his or her eyes are open is determined, and image data in which his or her eyes are open is recognized as a base image used when a hand shake correction is made, thereby improving an image quality.

Figure 2:
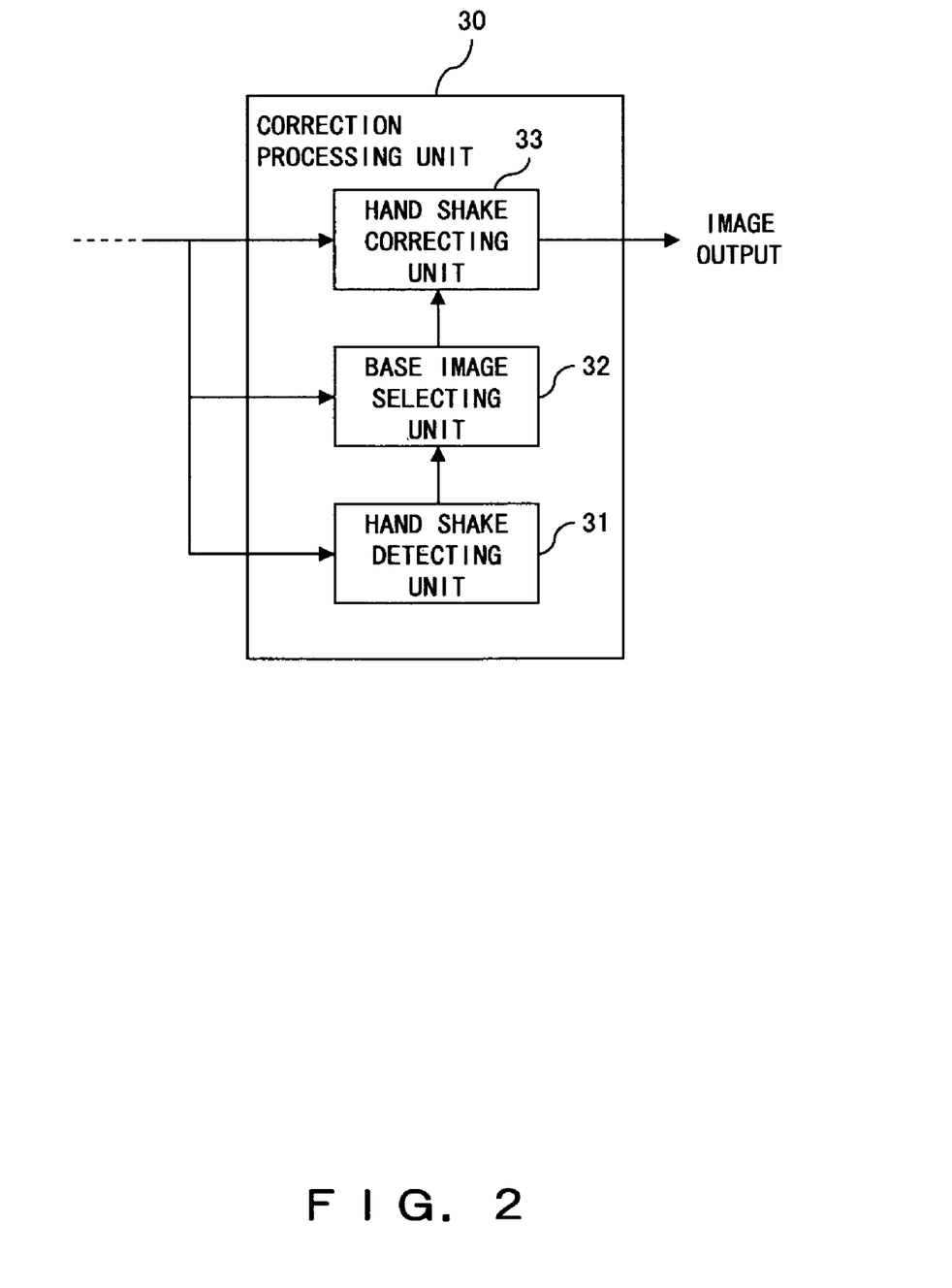
FIG. 2 is a block diagram showing a configuration of a correction processing unit common to first, second, and third preferred embodiments.

FIG. 2 is a block diagram showing a configuration of a correction processing unit common to the first, the second, and the third preferred embodiments.

As shown in this figure, the correction processing unit 30 comprises a hand shake detecting unit 31, a base image selecting unit 32, and a hand shake correcting unit 33.

The hand shake detecting unit 31 detects, for example, an edge (outline), which is a boundary of a tone change within each of a plurality of pieces of captured image data, for the plurality of pieces of captured image data, and calculates a vector quantity, namely, the amount of shake in upward, downward, left, right, clockwise or counterclockwise direction among the respective pieces of captured image data by performing a process for tracing the direction and the amount of move of the edge portion among the respective pieces of image data captured with continuous shooting.

The base image selecting unit 32 calculates, for example, the resolution of a detected edge portion for the plurality of pieces of captured image data, and outputs image data, the resolution of which is the highest among the plurality of pieces of captured image data, to the hand shake correcting unit 33 as base image data used when the hand shake correction is made, in the first and the second preferred embodiments.

The hand shake correcting unit 33 makes the alignment of the plurality of pieces of captured image data based on the base image data, and synthesizes the plurality of pieces of captured image data into one piece of image data (makes the hand shake correction) based on the alignment information.

Figure 3:
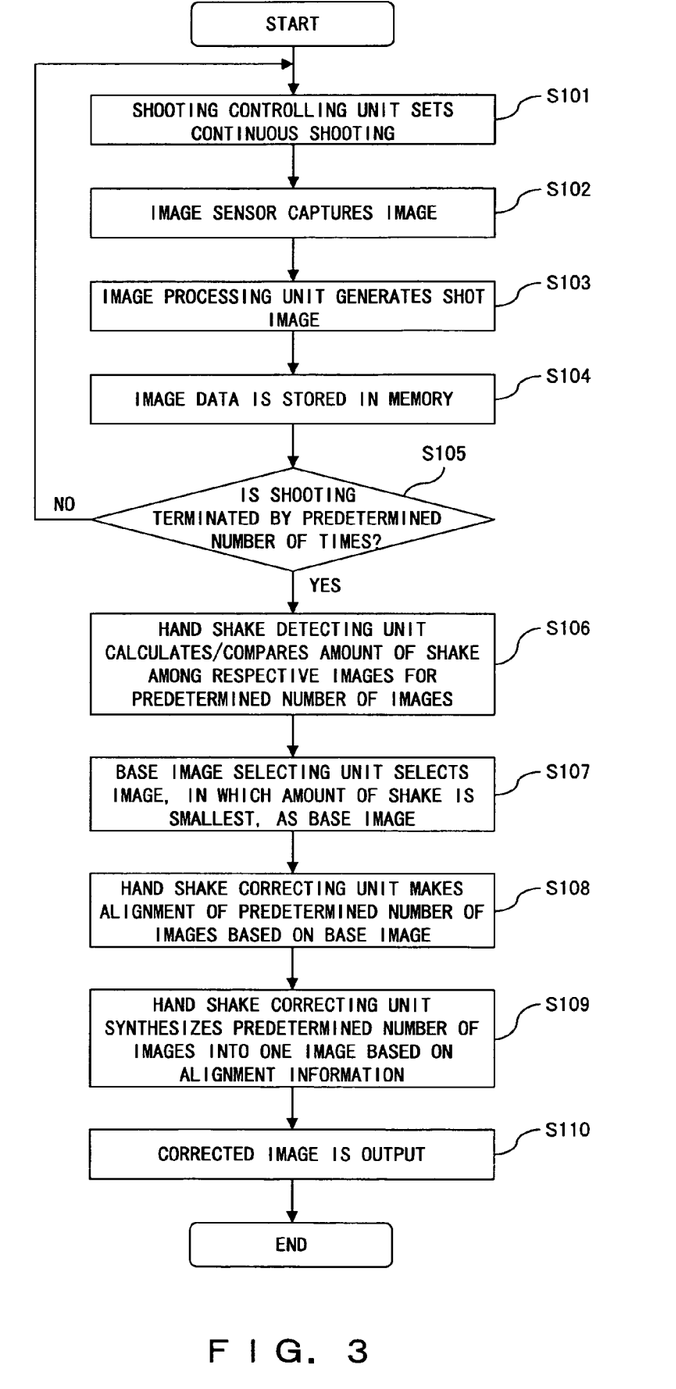
FIG. 3 is a flowchart showing an image capturing process and a hand shake correction process in the first preferred embodiment.

FIG. 3 is a flowchart showing the image capturing process and the hand shake correction process in the first preferred embodiment. The processes represented by this flowchart are performed by the constituent elements shown in FIGS. 1 and 2.

Firstly, in step S101, the shooting controlling unit 13 sets continuous shooting. With the continuous-shooting, the shooting controlling unit 13 outputs a control signal, which includes exposure control information calculated for an image capturing target, to the image sensor 12 in response to a shooting instruction.

Then, in step S102, a plurality of pieces of image data are captured via the image capturing process performed by the image sensor 12 (the processes performed by the above described light receiving unit and signal outputting unit). Namely, the image sensor 12 photo-electrically converts light received from the image capturing target via the lens 11 into an electric charge, stores the electric charge, and outputs the stored electric charge to the image processing unit as photo-electrically converted data.

In step S103, the image processing unit 18 generates (shot) image data. Namely, the image processing unit 18 performs processes such as a color separation process, a gamma correction process for linearly expressing lightness on a display, a white balance control process for expressing white as white regardless of the temperature of a light source, and the like based on the photo-electrically converted data (referred to also as an input signal or raw data). The input signal is converted into a required format such as a YUV signal, an RGB signal, etc. via the color separation process.

Then, in step S104, the image data generated by the image processing unit 18 is stored in the memory 22.

The number of times that shooting is made is predetermined, by way of example, for each image capturing device. Subsequently, in step 105, it is determined whether or not shooting is made by the predetermined number of times.

If it is determined in step S105 that shooting is not made by the predetermined number of times, the flow goes back to step S101.

Or, if it is determined in step S105 that shooting is made by the predetermined number of times, the hand shake detecting unit 31 detects, for example, an edge (outline), which is a boundary of a tone change within each of the plurality of pieces (the number of pieces corresponding to the predetermined number of times) of image data, for the plurality of pieces of image data stored in the memory 22, performs a process for tracing the direction and the amount of move of the edge portion among the respective pieces of image data captured with continuous shooting, and calculates a vector quantity, namely, the amount of shake in upward, downward, left, right, clockwise, or counterclockwise direction among the respective pieces of image data as a result of the tracing process in step S106. Note that the amount of shake may be calculated with a method other than the method for detecting an edge.

In step S107, the base image selecting unit 32 calculates, for example, the resolution of the detected edge portion for the plurality of pieces of captured image data, and outputs image data the resolution of which is the highest among the plurality of pieces of captured image data to the hand shake correcting unit 33 as base image data used when the hand shake correction is made.

Then, in step S108, the hand shake correcting unit 33 makes the alignment of the plurality of pieces of captured image data based on the base image data. With this alignment, the hand shake correcting unit 33 calculates, in order to superimpose corresponding pixels, the amount of shift of other image data in upward, downward, left or right direction or their angle of rotation in clockwise or counterclockwise direction with reference to the base image data by using the calculated amount of shake in upward, downward, left, right, clockwise or counterclockwise direction among the respective pieces of image data.

In step S109, the hand shake correcting unit 33 synthesizes the plurality of pieces of captured image data into one piece of image data based on the alignment information obtained in step S108. With this synthesis process, by way of example, for pixels which a correspondence can be made in all of pieces of image data, their values are superimposed and reflected on a pixel within the synthesized image, meanwhile, for a pixel which exists only in any of the plurality of pieces of image data, its value is multiplied by a number by which image data is superimposed, and reflected on a pixel within the synthesized image.

In step S110, the correction processing unit 30 outputs the synthesized image data to the memory (not shown) for storing image data in the succeeding stage.

Figure 4:
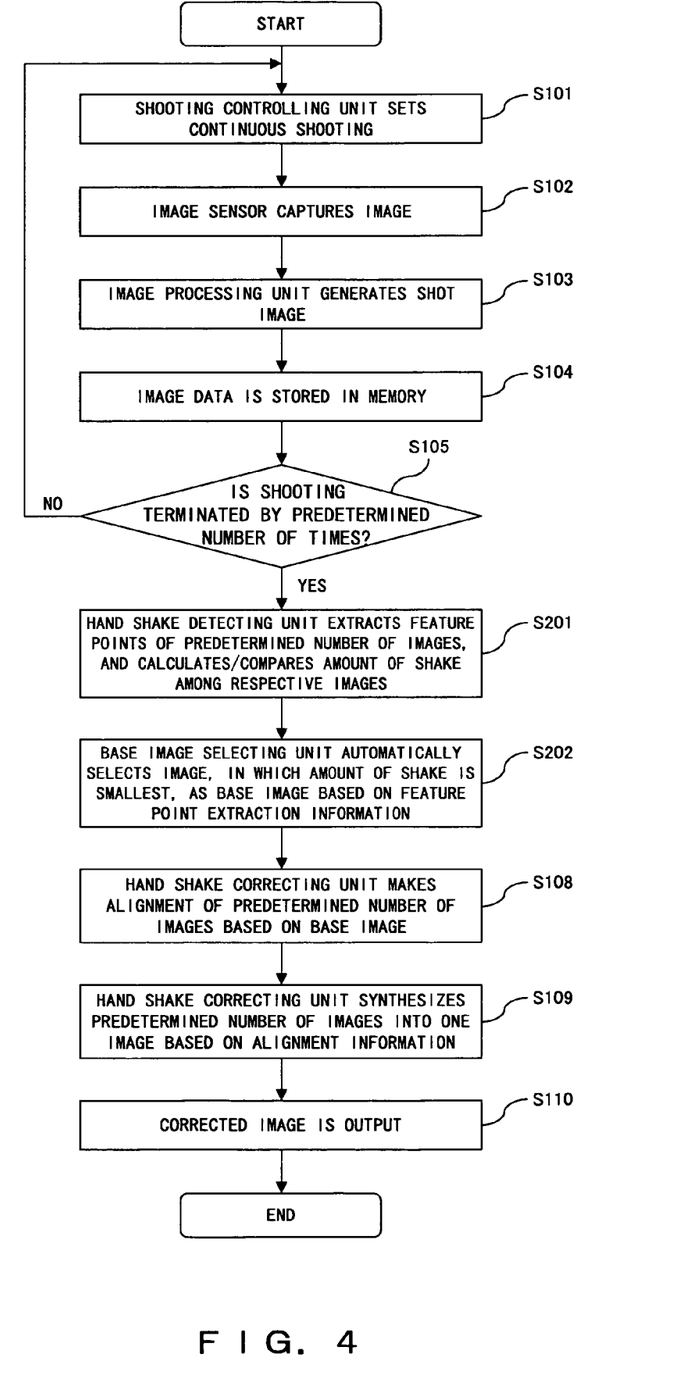
FIG. 4 is a flowchart showing an image capturing process and a hand shake correction process in the second preferred embodiment.

FIG. 4 is a flowchart showing an image capturing process and a hand shake correction process in the second preferred embodiment. The processes represented by this flowchart are performed by the constituent elements shown in FIGS. 1 and 2.

Steps S106 and S107 of FIG. 3 are replaced by steps S201 and 202 in FIG. 4. Here, only operations in steps S201 and S202 are described.

(If it is determined in step S105 that shooting is made by the predetermined number of times), the hand shake detecting unit 31 detects, for example, an edge (outline), which is a boundary of a tone change within each piece of image data, for the plurality of pieces (the number of pieces corresponding to the predetermined number of times) of image data stored in the memory 22, and extracts only a portion that is easy to be identified as a feature such as a high brightness point, an end point, a vertex, a branch point, a crossing point, etc. as a feature point from the edge portion in step S201. Then, the hand shake detecting unit 31 performs a process for tracing the direction and the amount of move of the feature point portion among the respective pieces of image data captured with continuous shooting, and calculates a vector quantity, namely, the amount of shake in upward, downward, left, right, clockwise, or counterclockwise direction among the respective pieces of image data as a result of the tracing process.

In step S202, the base image selecting unit 32 calculates the resolution of the detected feature point portion for the plurality of pieces of captured image data, and outputs image data the resolution of which is the highest among the plurality of pieces of captured image data to the hand shake correcting unit 33 as base image data used when the hand shake correction is made.

The third preferred embodiment is described next.

Also in the third preferred embodiment, the hand shake detecting unit 31 and the hand shake correcting unit 33, which are shown in FIG. 2, are similar to those in the first or the second preferred embodiment. Therefore, their explanations are omitted.

In the third preferred embodiment, the correction processing unit 30 of FIG. 2 sequentially issues an instruction to use each of a plurality of pieces of captured image data as a base image to the base image selecting unit 32 for all of the plurality of pieces of captured image data. The base image selecting unit 32 outputs image data, which corresponds to a number among the plurality of pieces of captured image data by using the instruction (the number identifying image data) received from the correction processing unit 30, to the hand shake correcting unit 33 as base image data used when a hand shake correction is made.

The plurality of pieces of image data to which the hand shake correction is made are output to a memory (not shown) for storing image data in a stage succeeding the correction processing unit 30, and stored.

One of the plurality of pieces of image data stored in the memory for storing image data is displayed on an image display unit (not shown) comprised by a device such as a digital camera, a cellular phone, etc., which includes the image capturing device. A user switches image data, which is displayed on the image display unit, among the plurality of pieces of image data, or selects image data to be stored from among the plurality of pieces of image data stored in the memory for storing image data, via a user interface unit (not shown).

Figure 5:
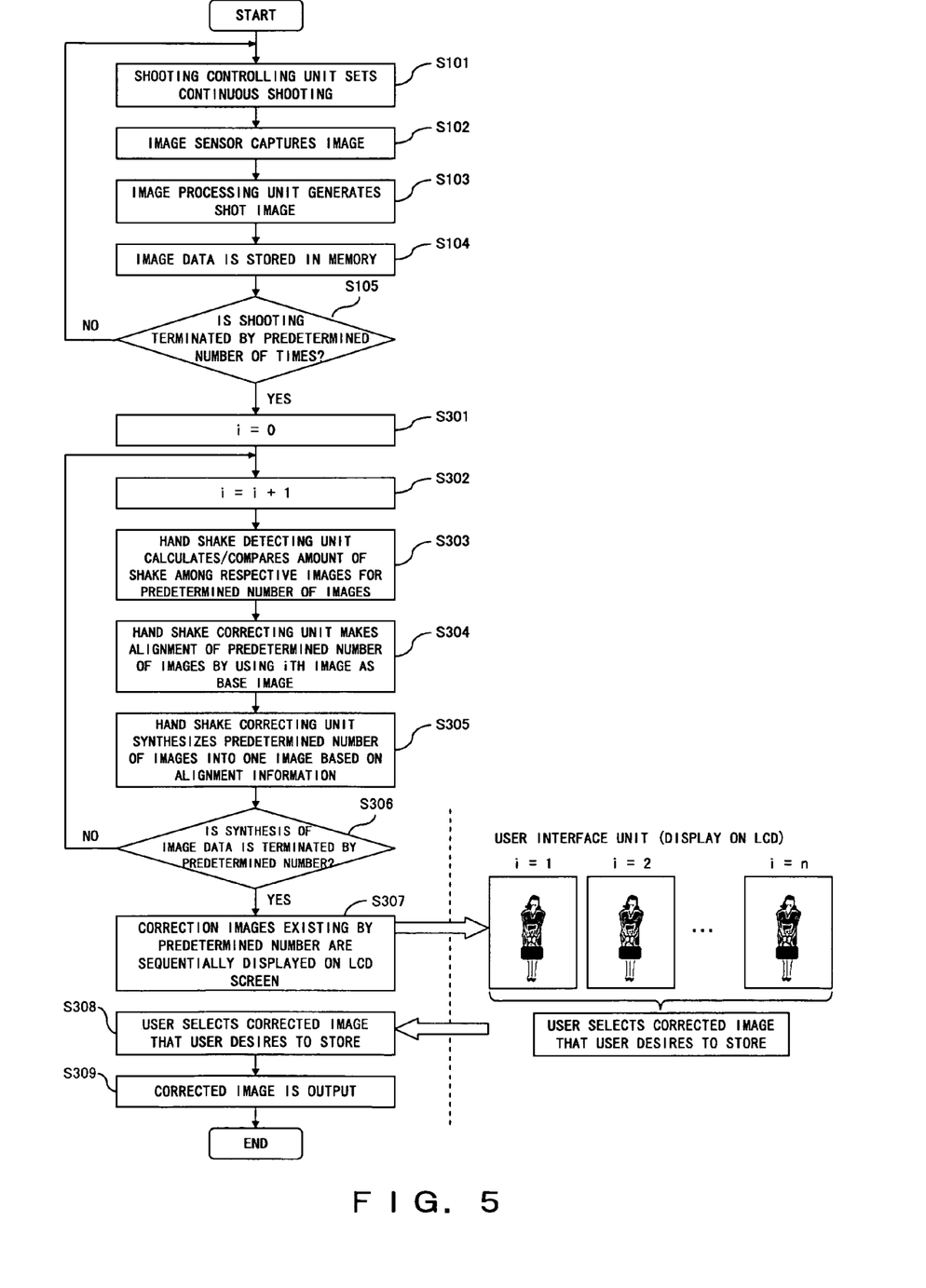
FIG. 5 is a flowchart showing an image capturing process and a hand shake correction process in the third preferred embodiment.

FIG. 5 is a flowchart showing an image capturing process and a hand shake correction process in the third preferred embodiment. The processes represented by this flowchart are performed by the constituent elements shown in FIGS. 1 and 2.

Since steps S101 to S105 are similar to those of FIG. 3, their explanations are omitted.

(If it is determined in step S105 that shooting is made by the predetermined number of times), the value of a counter i, which holds a number for identifying the plurality of pieces of captured image data is initiated to 0 in step S301.

Next, in step S302, the value of the counter i is incremented.

Then, in step S303, the hand shake detecting unit 31 of FIG. 2 detects for example, an edge (outline), which is a boundary of a tone change within each piece of image data, for the plurality of pieces (the number of pieces corresponding to the predetermined number of times) of image data stored in the memory 22, performs a process for tracing the direction and the amount of move of the edge portion among the respective pieces of image data captured with continuous shooting, and calculates a vector quantity, namely, the amount of shake in upward, downward, left, right, clockwise or counterclockwise direction among the respective pieces of image data as a result of the tracing process. Note that the amount of shake may be calculated with a method other than the method for detecting an edge.

In step S304, the hand shake correcting unit 33 of FIG. 2 makes the alignment of the plurality of pieces of captured image data by using ith image data among the plurality of pieces of captured image data as base image data. With this alignment, the hand shake correcting unit 33 calculates, in order to superimpose corresponding pixels, the amount of shift of other image data in upward, downward, left or right direction or their angle of rotation in clockwise or counterclockwise direction with reference to the base image data by using the calculated amount of shake in upward, downward, left or right direction among the respective pieces of image data.

In step S305, the hand shake correcting unit 33 of FIG. 2 synthesizes the plurality of pieces of captured image data into one piece of image data based on the alignment information obtained in step S304. With this synthesis process, by way of example, for pixels which a correspondence can be made in all of pieces of image data, their values are superimposed and reflected on a pixel within the synthesized image, meanwhile, for a pixel which exists only in any of the plurality of pieces of image data, its value is multiplied by a number by which image data is superimposed, and reflected on a pixel within the synthesized image. The synthesized image is output to a memory (not shown in FIG. 2) for storing image data in a stage succeeding the correction processing unit 30.

In step S306, it is determined whether or not the synthesis of the image data is terminated by the predetermined number (the number of pieces of captured image data).

If it is determined in step S306 that the synthesis of the image data is not terminated by the predetermined number, the flow goes back to step S302.

Of, if it is determined in step S306 that the synthesis of the image data is terminated by the predetermined number, a control is transferred to step S307.

In step S307, the predetermined number of pieces of (synthesized) image data, which are stored in the memory for storing image data in the stage succeeding the correction processing unit 30, are sequentially displayed on the image display unit (not shown) according to a switching instruction that a user issues via the user interface unit (not shown).

In step S308, the user stores image data that he or she desires to store by issuing a decision instruction to his or her desired image data via the user interface unit while viewing the (synthesized) image data, which are sequentially displayed on the image display unit.

In this case, for example, as indicated by step S309, the user interface unit may output the stored image data to a memory in a further succeeding stage.

Figure 6:
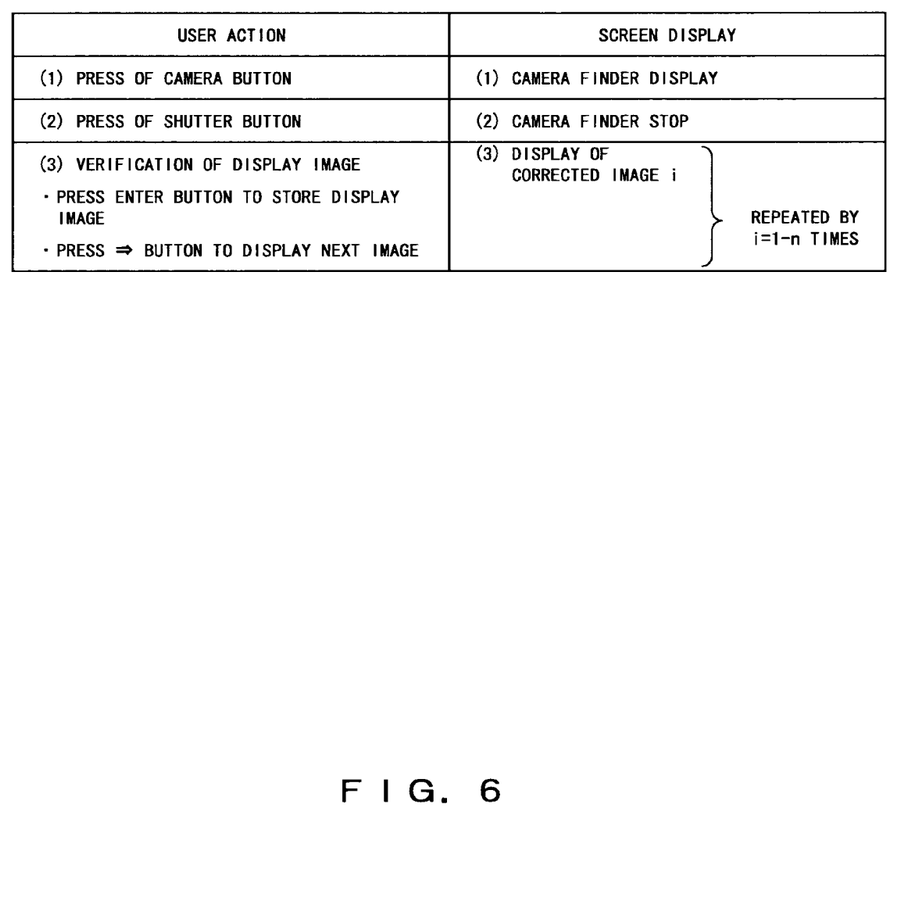
FIG. 6 is a schematic explaining operational procedures in the third preferred embodiment.

FIG. 6 is a schematic explaining operational procedures in the third preferred embodiment.

As shown in this figure, by way of example, for a device type such as a cellular phone, etc, a camera button (not shown) is first pressed, whereby an image capturing target is made visible on the display of the device (camera finder display is made).

Then, a shutter button is pressed, whereby the camera finder display is stopped, and the target image-captured at this time point is captured as image data.

Additionally, a ⇒button is pressed, whereby image data displayed on the image display unit is switched to the next one as indicated by step S307.

Furthermore, an enter button is pressed, whereby the image data displayed on the image display unit is stored as indicated by step S308.

Figure 7:
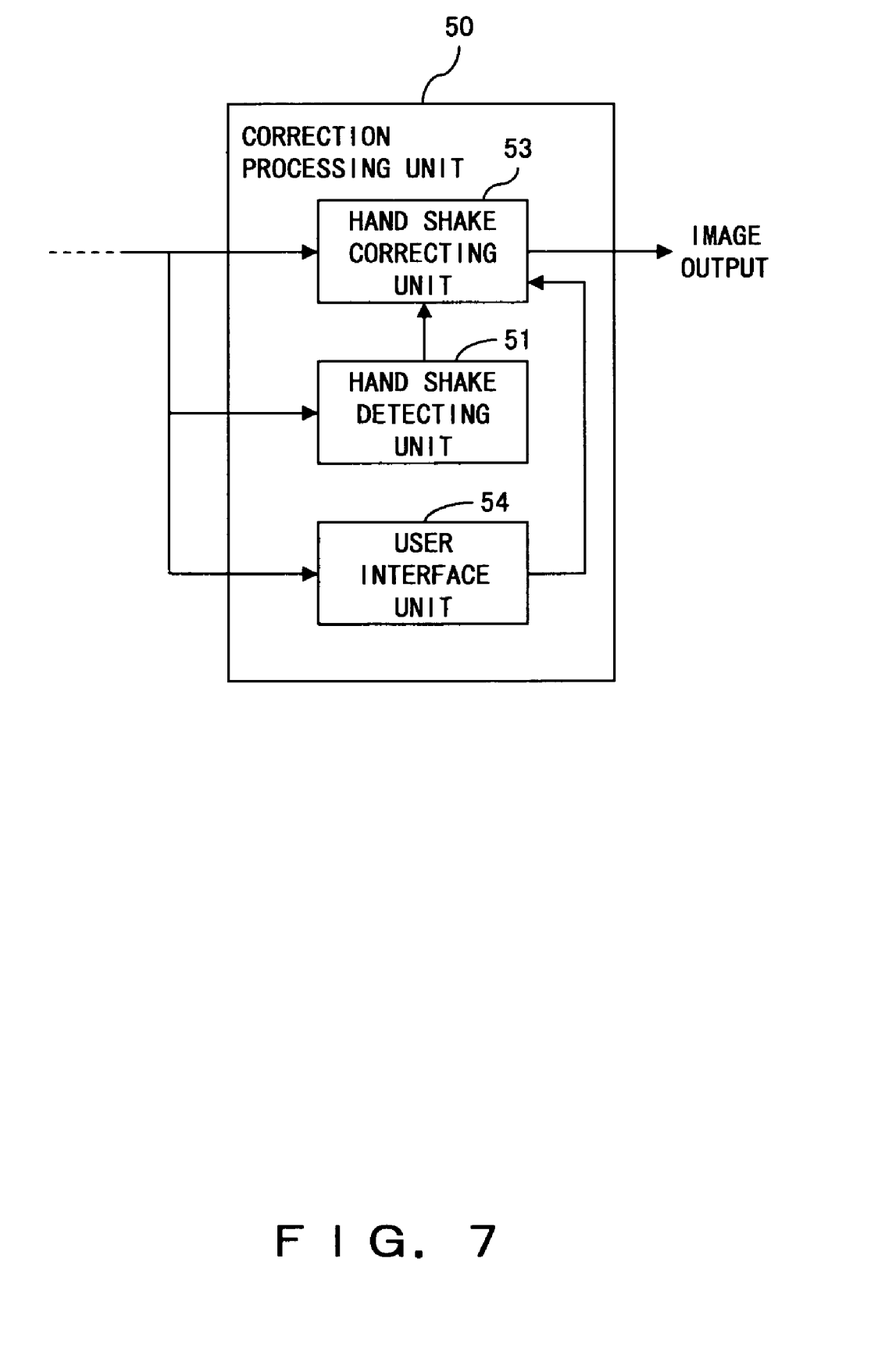
FIG. 7 is a block diagram showing a configuration of a correction processing unit in a fourth preferred embodiment.

FIG. 7 is a block diagram showing a configuration of a correction processing unit in the fourth preferred embodiment.

As shown in this figure, the correction processing unit 50 comprises a hand shake detecting unit 51, a hand shake correcting unit 53, and a user interface unit 54.

Since the hand shake detecting unit 51 and the hand shake correcting unit 53 are similar to the hand shake detecting unit 31 and the hand shake correcting unit 33, which are shown in FIG. 2, their explanations are omitted.

The user interface unit 54 is an interface unit used by a user to specify base image data, which is used when a hand shake correction is made, from among a plurality of pieces of image data captured into the memory 22 with continuous shooting.

One of the plurality of pieces of image data stored in the memory 22 is displayed on an image display unit (not shown) comprised by a device such as a digital camera, a cellular phone, etc., which includes the image capturing device. A user switches image data, which is displayed on the image display unit, among the plurality of pieces of image data, or selects base image data, which is used when the hand shake correction is made, from among the plurality of pieces of image data stored in the memory 22, via the user interface unit 54.

In the fourth preferred embodiment, the correction processing unit 50 performs the hand shake correction process for a plurality of pieces of captured image data by using image data that a user specifies via the user interface unit 54 as a base image.

Figure 8:
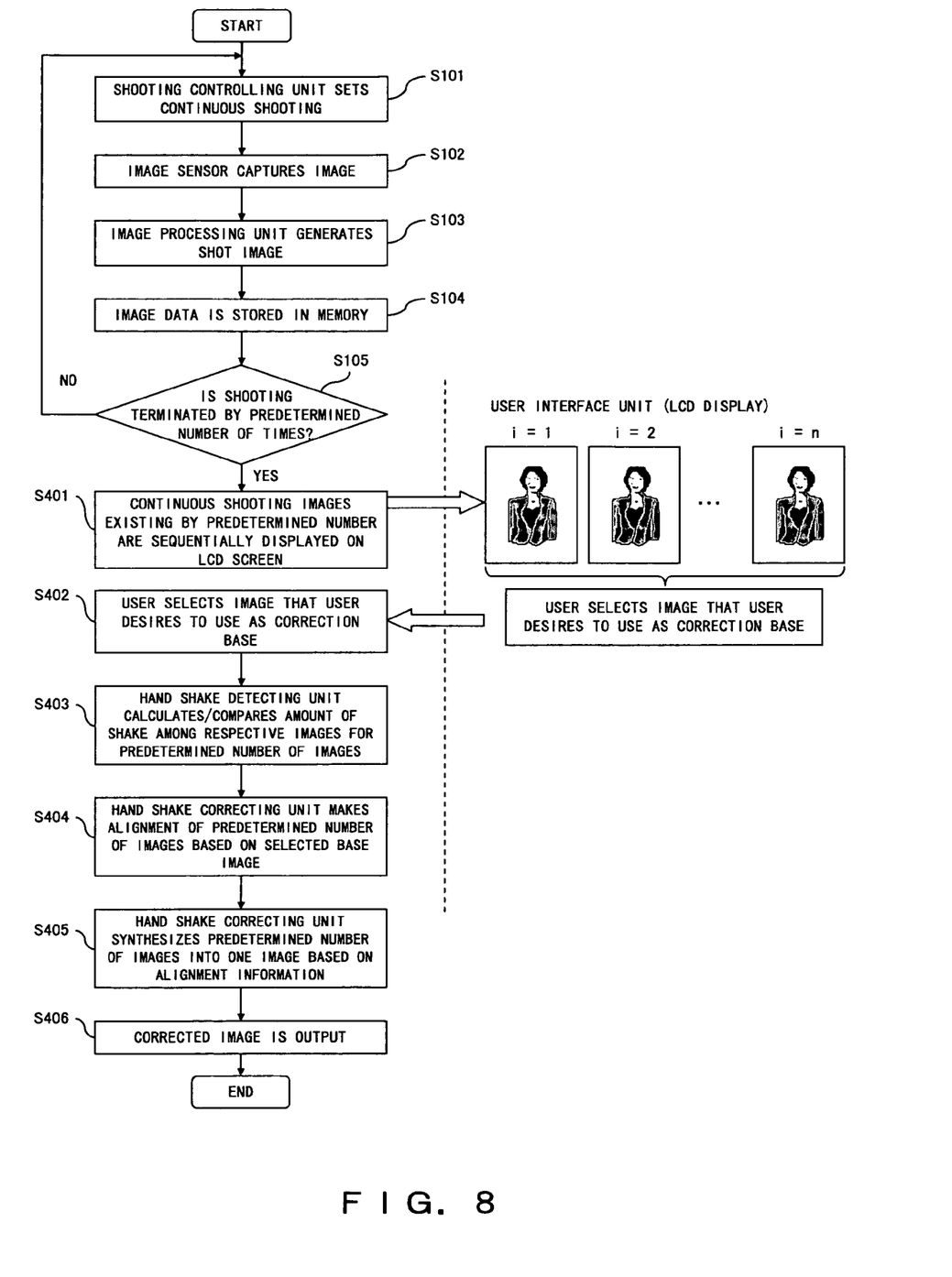
FIG. 8 is a flowchart showing an image capturing process and a hand shake correction process in the fourth preferred embodiment.

FIG. 8 is a flowchart showing an image capturing process and a hand shake correction process in the fourth preferred embodiment. The processes represented by this flowchart are performed by the constituent elements shown in FIGS. 1 and 7.

Since steps S101 to S105 are similar to those of FIG. 3, their explanations are omitted.

(If it is determined in step S105 that shooting is made by the predetermined number of times), the plurality of pieces of captured image data, which are stored in the memory 22, are sequentially displayed on the image display unit (not shown) according to a switching instruction that a user issues via the user interface unit 54 in step S401.

Then, in step S402, the user issues a decision instruction to image data that he or she desires to use as a base image when the hand shake correction is made while viewing the (synthesized) image data sequentially displayed on the image display unit.

Then, in step S403, the hand shake detecting unit 51 of FIG. 7 detects, for example, an edge (outline), which is a boundary of a tone change within each piece of image data, for the plurality of pieces (the number of pieces corresponding to the predetermined number of times) of image data stored in the memory 22, performs a process for tracing the direction and the amount of move of the edge portion among the respective pieces of image data captured with continuous shooting, and calculates a vector quantity, namely, the amount of shake in upward, downward, left, right, clockwise, or counterclockwise direction among the respective pieces of image data as a result of the tracing process. Note that the amount of shake may be calculated with a method other than the method for detecting an edge.

In step S404, the hand shake correcting unit 53 of FIG. 7 makes the alignment of the plurality of pieces of captured image data by using the image data specified via the user interface unit 54 as base image data. With this alignment, the hand shake correcting unit 53 calculates, in order to superimpose corresponding pixels, the amount of shift of other image data in upward, downward, left or right direction or their angle of rotation in clockwise or counterclockwise direction with reference to the base image data by using the calculated amount of shake in upward, downward, left or right direction among the respective pieces of image data.

In step S405, the hand shake correcting unit 53 of FIG. 7 synthesizes the plurality of pieces of captured image data into one piece of image data based on the alignment information obtained in step S404. With this synthesis process, by way of example, for pixels which a correspondence can be made in all of pieces of image data, their values are superimposed and reflected on a pixel within the synthesized image, meanwhile, for a pixel which exists only in any of the plurality of pieces of image data, its value is multiplied by a number by which image data is superimposed, and reflected on a pixel within the synthesized image.

In step S406, the correction processing unit 50 outputs the synthesized image data to a memory (not shown) for storing image data in a succeeding stage.

Figure 9:
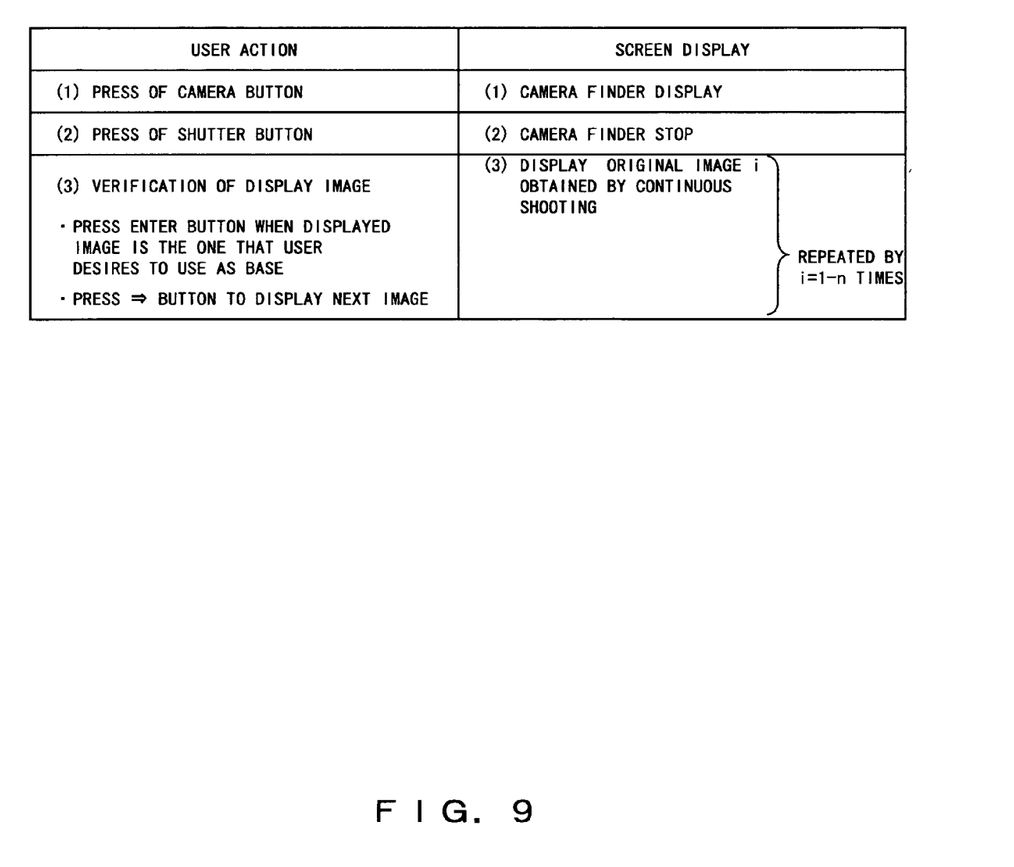
FIG. 9 is a schematic explaining operational procedures in the fourth preferred embodiment.

FIG. 9 is a schematic explaining operational procedures in the fourth preferred embodiment.

As shown in this figure, by way of example, for a device type such as a cellular phone, etc, a camera button (not shown) is first pressed, whereby an image capturing target is made visible on the display of the device (camera finder display is made).

Then, a shutter button is pressed, whereby the camera finder display is stopped, and the target image-captured at this time point is captured as image data.

Additionally, a ⇒button is pressed, whereby image data displayed on the image display unit is switched to the next one as indicated by step S401.

Furthermore, an enter button is pressed, whereby the image data displayed on the image display unit is selected as base image data, which is used when the hand shake correction is made, as indicated by step S402.

Figure 10:
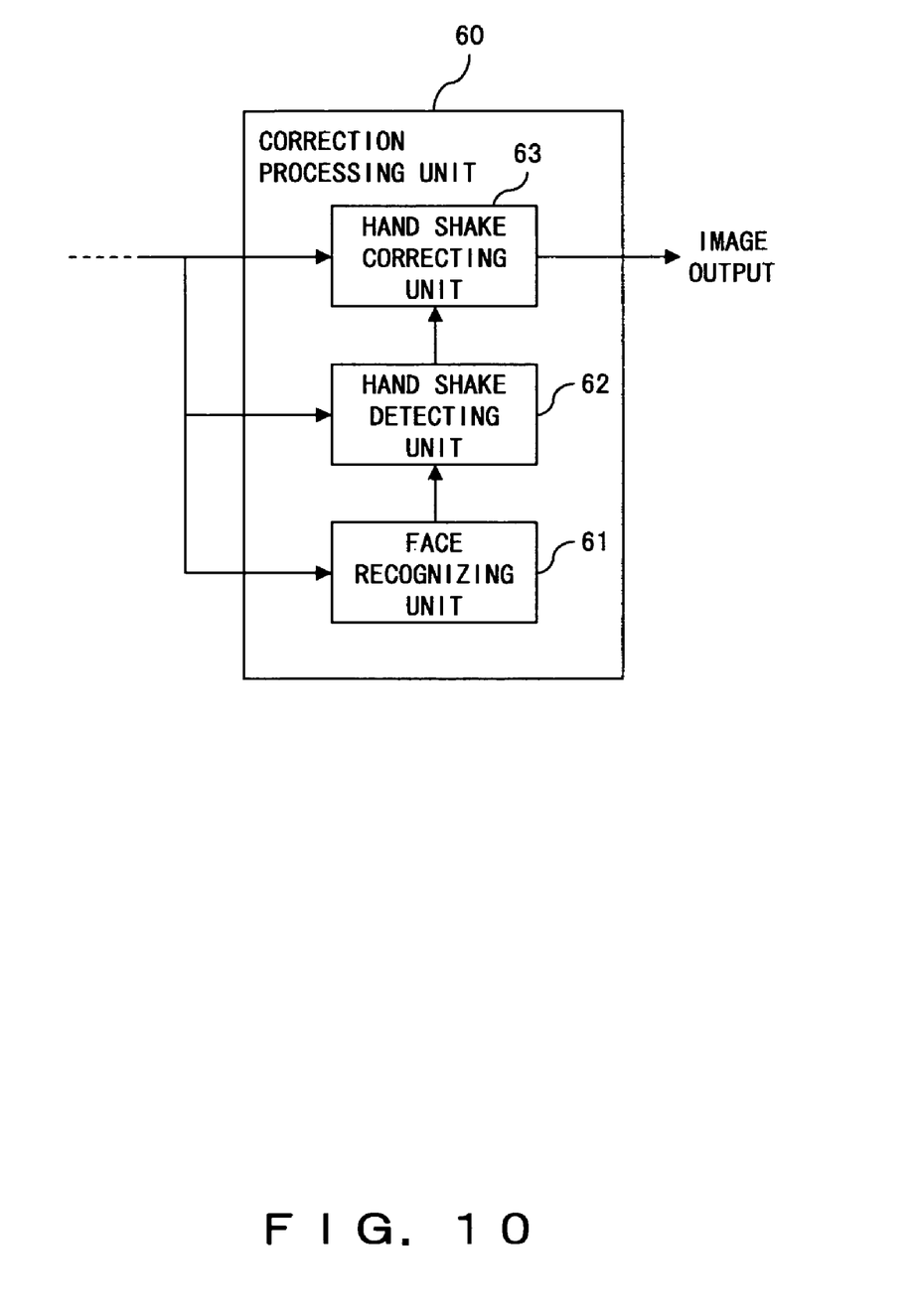
FIG. 10 is a block diagram showing a configuration of a correction processing unit in a fifth preferred embodiment.

FIG. 10 is a block diagram showing a configuration of a correction processing unit in the fifth preferred embodiment.

As shown in this figure, the correction processing unit 60 comprises a face recognizing unit 61, a hand shake detecting unit 62, and a hand shake correcting unit 63.

Since the hand shake detecting unit 62 and the hand shake correcting unit 63 are similar to the hand shake detecting unit 31 and the hand shake correcting unit 33, which are shown in FIG. 2, their explanations are omitted.

The face recognizing unit 61 first detects a search region of a face. Namely, the face recognizing unit 61 extracts a skin color region from image data as color information, and recognizes the extracted skin color region as the search region of the face if the shape and the area of the skin color region satisfy conditions as a region of a face.

Next, the face recognizing unit 61 extracts face feature points, which become candidates of the elements of a face (such as the right eyebrow, the left eyebrow, the right eye, the left eye, nostrils, and a mouth). The face recognizing unit 61 extracts, for example, regions corresponding to the following ones from the detected search region of the face.
1. a horizontally thin region
2. a region the shape of which is almost elliptical, and the color of which is red
3. a region the brightness value of which is lower than that of a skin color region.

For example, a face feature point the shape of which is horizontally thin and the brightness value of which is low and does not change significantly can be regarded as an eyebrow or a closed eye. Additionally, a face feature point the shape of which is almost elliptical and in which the central dark region of the ellipse is sandwiched by two bright regions can be regarded as an open eye. Furthermore, a face feature point the shape of which is almost elliptical and the color information of which is somewhat near to red can be regarded as a mouth.

The face recognizing unit 61 detects both eyes from among the plurality of pieces of image data stored in the memory 22, and selects image data, in which the degree of opening of both eyes is the highest, as base image data used when a hand shake correction is made.

In the fifth preferred embodiment, the correction processing unit 60 performs a hand shake correction process for a plurality of pieces of captured image data by using image data selected by the face recognizing unit 61 as a base image.

Figure 11:
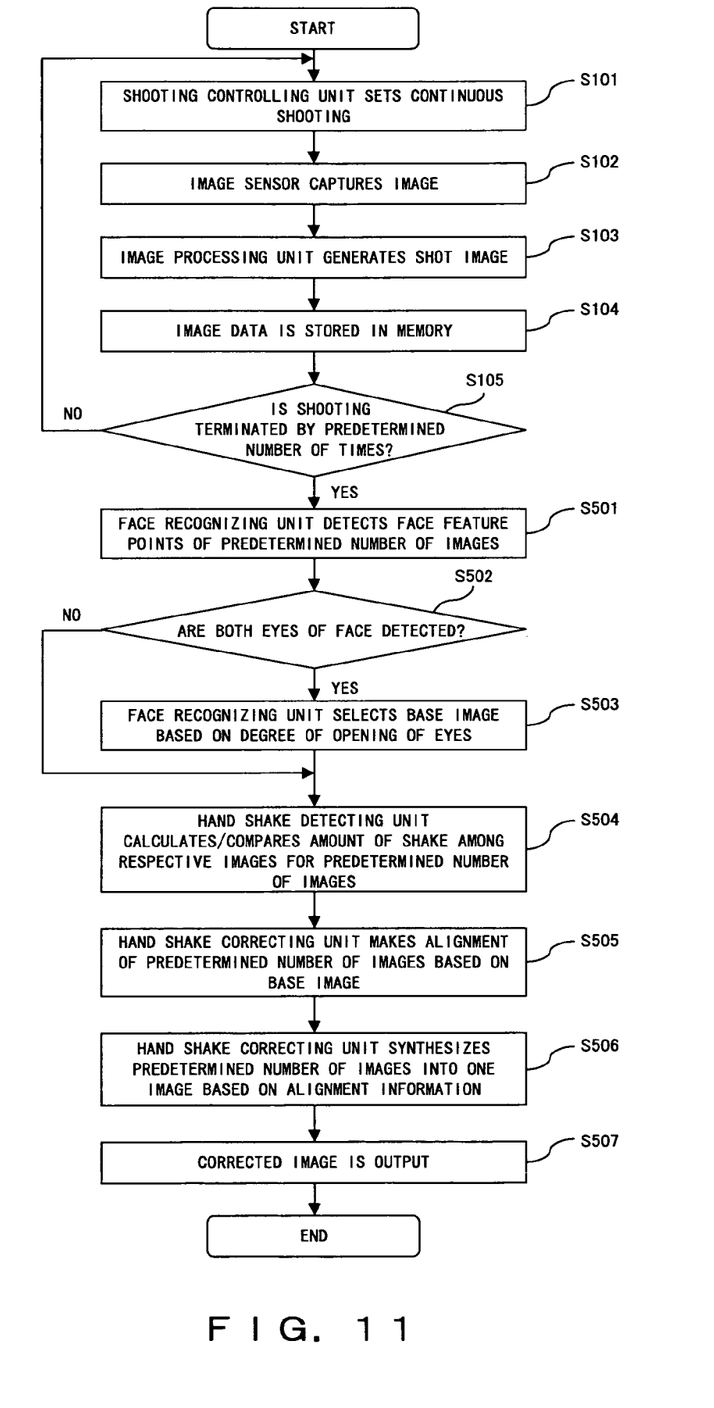
FIG. 11 is a flowchart showing an image capturing process and a hand shake correction process in the fifth preferred embodiment.

FIG. 11 is a flowchart showing an image capturing process and the hand shake correction process in the fifth preferred embodiment. The processes represented by this flowchart are performed by the constituent elements shown in FIGS. 1 and 10.

Since steps S101 to S105 are similar to those of FIG. 3, their explanations are omitted.

(If it is determined in step S105 that shooting is made by the predetermined number of times), for example, if an image capturing target includes the face of a person, the face recognizing unit 61 detects face feature points for the respective pieces of captured image data in step S501.

In step S502, the correction processing unit 60 determines whether or not image data including both eyes of the face exists in results of the detection in step S501.

If the correction processing unit 60 determines in step S502 that image data including both eyes of the face does not exist in the results of the detection, the flow goes to step S504. In this case, image data having a predetermined number among the plurality of pieces of captured image data is selected as base image data.

Or, if the correction processing unit 60 determines in step S502 that one or more pieces of image data including both eyes of the face exist in the results of the detection, the face recognizing unit 61 selects image data in which both eyes are open most widely as base image data, which is used when the hand shake correction is made, from among the image data including both eyes in step S503.

Then, in step S504, the hand shake detecting unit 62 of FIG. 10 detects, for example, an edge (outline), which is a boundary of a tone change within each of the plurality of pieces of image data, for the plurality of pieces (the number of pieces corresponding to the predetermined number of times) of image data stored in the memory 22, performs a process for tracing the direction and the amount of move of the edge portion among the respective pieces of image data captured with continuous shooting, and calculates a vector quantity, namely, the amount of shake in upward, downward, left, right, clockwise, or counterclockwise direction among the respective pieces of image data as a result of the tracing process. Note that the amount of shake may be calculated with a method other than the method for detecting an edge.

Then, in step S505, the hand shake correcting unit 63 of FIG. 10 makes the alignment of the plurality of pieces of captured image data by using the image data selected by the face recognizing unit 61 as base image data. With this alignment, the hand shake correcting unit 63 calculates, in order to superimpose corresponding pixels, the amount of shift of other image data in upward, downward, left or right direction or their angle of rotation in clockwise or counterclockwise direction with reference to the base image data by using the calculated amount of shake in upward, downward, left, right, clockwise or counterclockwise direction among the respective pieces of image data.

In step S506, the hand shake correcting unit 63 of FIG. 10 synthesizes the plurality of pieces of captured image data into one piece of image data based on the alignment information obtained in step S505. With this synthesis process, by way of example, for pixels which a correspondence can be made in all of pieces of image data, their values are superimposed and reflected on a pixel within the synthesized image, meanwhile, for a pixel which exists only in any of the plurality of pieces of image data, its value is multiplied by a number by which image data is superimposed, and reflected on a pixel within the synthesized image.

In step S507, the correction processing unit 60 outputs the synthesized image data to a memory (not shown) for storing image data in a succeeding stage.

Figure 12:
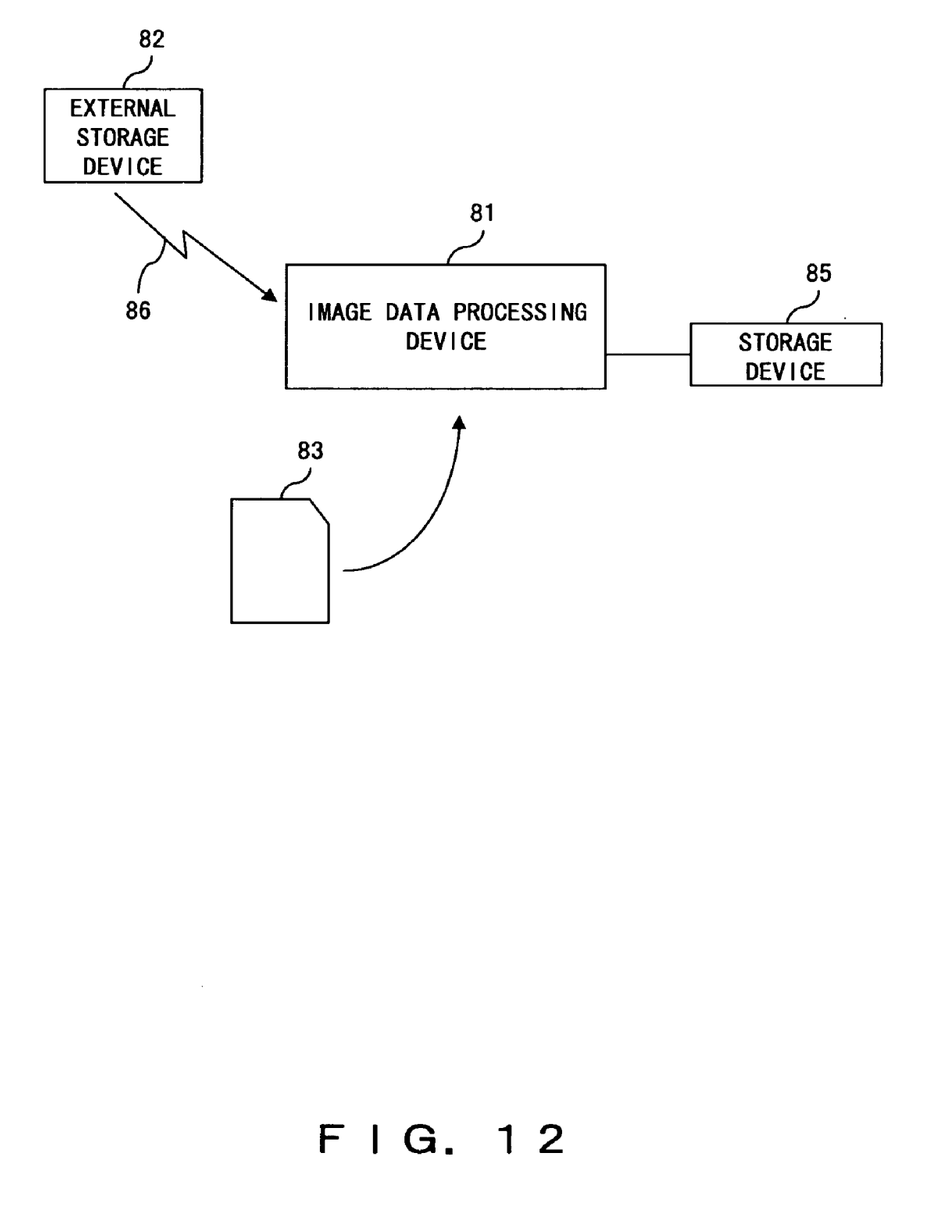
FIG. 12 exemplifies storage media.

FIG. 12 exemplifies storage media.

The hand shake correction processes according to the present invention can be implemented by an image data processing device 81. A program and data for the processes according to the present invention can be loaded from a storage device 85 of the image data processing device 81 into a memory of the image data processing device 81 and executed, can be loaded from a portable storage medium 83 into the memory of the image data processing device 81 and executed, or can be loaded from an external storage device 82 into the memory of the image data processing device 81 via a network 86 and executed.

What is claimed is:

1. An image capturing device having a hand shake correction function, comprising:
   an image sensor to photo-electrically convert light received from an image capturing target, and to output the photo-electrically converted data;
   an image data generating unit to generate image data using the photo-electrically converted data;

a shooting controlling unit to output exposure control information to the image sensor and to capture a plurality of pieces of image data, in response to a shooting instruction;

a base image selecting unit to select a base image, which is used when alignment is made, from among the plurality of pieces of captured image data;

a correction processing unit to make the alignment of the plurality of pieces of captured image data using the selected base image, and to generate one piece of image data by synthesizing the plurality of pieces of image data using a result of the alignment, and a face recognizing unit to recognize a degree of opening of eyes of a face of a person, which is included in the plurality of pieces of captured image data, wherein the base image selecting unit selects the base image using the degree of opening of eyes of the face of the person recognized by the face recognizing unit.

2. The image capturing device having a hand shake correction function according to claim 1, wherein the base image selecting unit selects image data, in which the degree of opening of eyes of the face of the person is recognized to be the highest by the face recognizing unit, as a base image used when the alignment is made.

3. A hand shake correction method with which a computer performs a hand shake correction process for a plurality of pieces of image data captured in response to a shooting instruction, comprising:

a base image selecting step of selecting a base image, which is used when alignment is made, from among the plurality of pieces of captured image data;

a correction processing step of making the alignment of the plurality of pieces of captured image data using the selected base image, and of generating one piece of image data by synthesizing the plurality of pieces of image data using a result of the alignment, and a face recognizing step of recognizing a degree of opening of eyes of a face of a person, which is included in the plurality of pieces of captured image data, wherein the base image selecting step selects the base image using the degree of opening of eyes of the face of the person recognized by the face recognizing step.

4. The hand shake correction method according to claim 3, wherein in the base image selecting step, image data, in which the degree of opening of eyes of the face of the person is recognized to be the highest in the face recognizing step, is selected as a base image used when the alignment is made.

5. A non-transitory storage medium on which is recorded a hand shake correction process program for causing a computer to execute a hand shake correction process for a plurality of pieces of image data captured in response to a shooting instruction, the program comprising:

a base image selecting step of selecting a base image, which is used when alignment is made, from among the plurality of pieces of captured image data;

an aligning step of making the alignment of the plurality of pieces of captured image data using the selected base image;

a correction image generating step of generating one piece of image data by synthesizing the plurality of pieces of captured image data using a result of the alignment, and a face recognizing step of recognizing a degree of opening of eyes of a face of a person, which is included in the plurality of pieces of captured image data, wherein the base image selecting step selects the base image using the degree of opening of eyes of the face of the person recognized by the face recognizing step.

6. The non-transitory storage medium according to claim 5, wherein the computer being included in an image capturing device having a hand shake correction function.

7. The non-transitory storage medium according to claim 5, wherein in the base image selecting step, image data, in which the degree of opening of eyes of the face of the person is recognized to be the highest in the face recognizing step, is selected as a base image used when the alignment is made.

8. A portable device having an anti-blur function, comprising:

an image sensor captures an image, and outputs captured image data;

a base image selecting unit selects a base image to be used for image alignment, the base image is selected, from a plurality of captured image data, in which blur is smallest among them, a correction processing unit aligns the plurality of captured image data using the selected base image, and generates a single image by synthesizing the plurality of aligned captured image data, and a face recognizing unit to recognize a degree of opening of eyes of a face of a person, which is included in the plurality of pieces of captured image data, wherein the base image selecting unit selects the base image using the degree of opening of eyes of the face of the person recognized by the face recognizing unit.

9. An image processing apparatus capable of processing a plurality of pieces of image data, the apparatus comprising:

a recognizing unit that recognizes a degree of opening of eyes of a face of a person, which is included in the plurality of image data;

a selecting unit that selects a base image among the plurality of image data, using the degree of opening of eyes of the face of the person recognized by the recognizing unit; and a correction unit that aligns the plurality of the image data using the selected base image, and that generates a single image by synthesizing the plurality of aligned the image data.

10. A non-transitory storage medium on which is recorded a program for causing a computer to execute a process for a plurality of pieces of image data, the program comprising:

a computer readable program code which causes the computer to recognize a degree of opening of eyes of a face of a person, which is included in the plurality of image data;

a computer readable program code which causes the computer to select a base image among the plurality of image data, using the degree of opening of eyes of the face of the person recognized by the recognizing;

a computer readable program code which causes the computer to align the plurality of the image data using the selected base image; and a computer readable program code which causes the computer to generate a single image by synthesizing the plurality of aligned the image data.

* * * * *